Dec. 20, 1938.  S. STERN  2,140,563
EDUCATIONAL APPARATUS
Filed Dec. 8, 1936  3 Sheets-Sheet 1

INVENTOR
*Sander Stern*
BY
*Samuel Ostrolenk*
ATTORNEY

Dec. 20, 1938.  S. STERN  2,140,563
EDUCATIONAL APPARATUS
Filed Dec. 8, 1936  3 Sheets-Sheet 2

INVENTOR
Sander Stern
BY
Samuel Ostrolenk
ATTORNEY

Dec. 20, 1938.  S. STERN  2,140,563

EDUCATIONAL APPARATUS

Filed Dec. 8, 1936   3 Sheets-Sheet 3

INVENTOR
Sander Stern
BY
Samuel Ostrolenk
ATTORNEY

Patented Dec. 20, 1938

2,140,563

UNITED STATES PATENT OFFICE 2,140,563

EDUCATIONAL APPARATUS

Sander Stern, New York, N. Y.

Application December 8, 1936, Serial No. 114,726

16 Claims. (Cl. 35—19)

This invention relates to demonstration equipment particularly useful in illustrating the principles of electrical circuits.

The instruction of electricity is relatively difficult because it is an abstract science dealing with invisible entities. Instruction and perception by the students is materially stimulated and enhanced by mechanical analogies for the electrical concepts. In accordance with my present invention, I contemplate means for mechanically representing a closed electrical circuit which may be arranged in any manner to simulate different electrical circuits in operation. I also provide simple mechanical means for measuring the relative effects in the closed operating circuit to simulate electrical measuring devices.

It is accordingly the main object of my present invention to provide novel apparatus for demonstrating electrical circuits.

Another object of my present invention is to provide novel means for setting up mechanical counterparts of a continuous electrical circuit.

A further object of my present invention is to provide novel apparatus for demonstrating electrical circuits which permits ready re-arrangement to simulate different circuit combinations.

These and other objects of my invention will become apparent in the following description taken in connection with the drawings, in which.

The demonstration equipment of my present invention is adapted to be mounted upon a board 10 containing an arrangement of holes 11 regularly arranged to receive pegs of the units to be supported in optional positions on the board 10. The various mechanical members may be arranged to simulate a variety of circuits as will be hereinafter described, and may be arranged at 10 different sections of the board 10.

Figure 1:
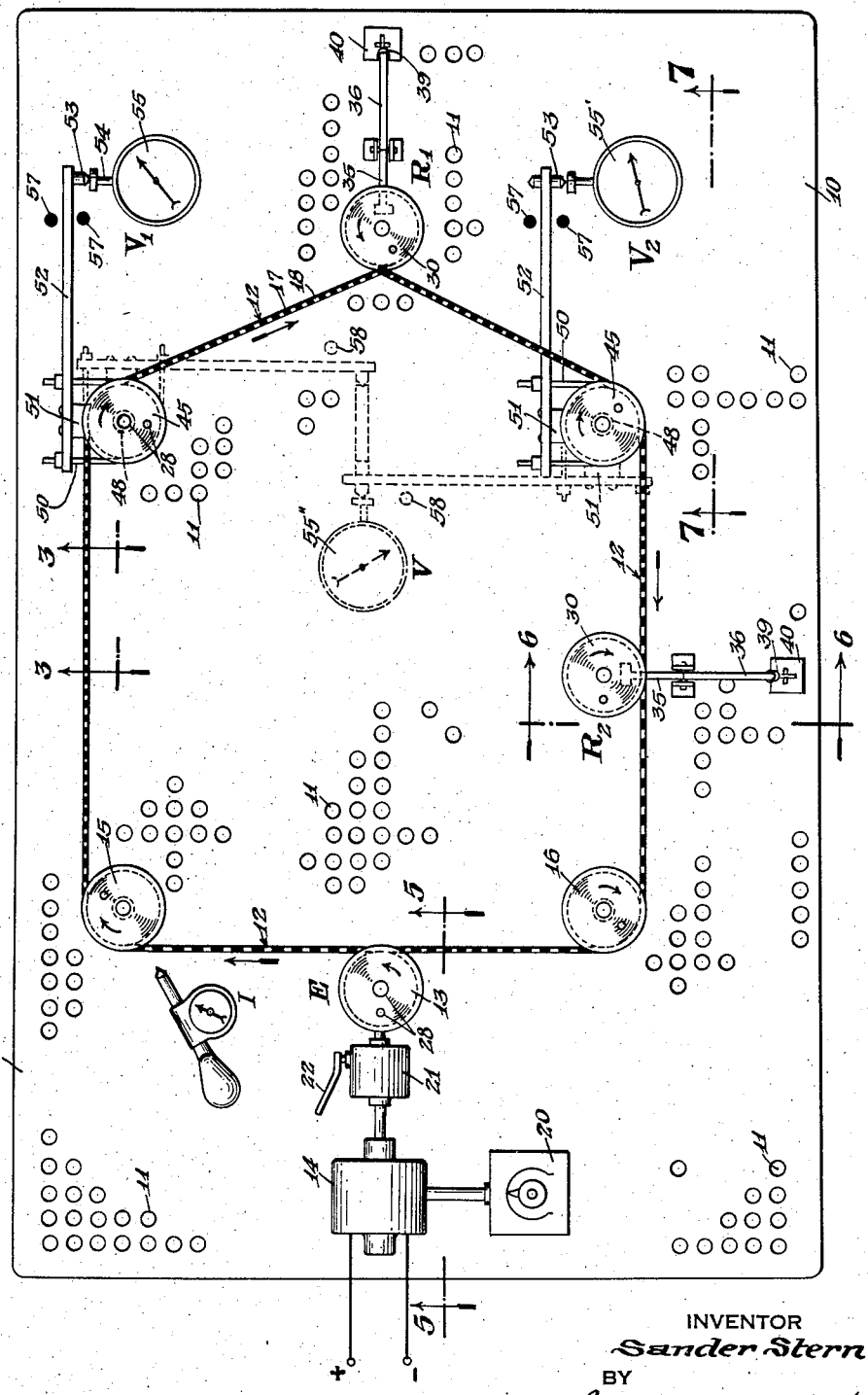
Figure 1 is a plan view of a preferred embodiment of my present invention shown arranged to represent the electrical circuit of Figure 2, which is a continuous direct current circuit.

Figure 1 is a plan view of the mechanical members arranged to simulate a direct current circuit. The various members are interconnected by a cord or suitable tape 12 having painted or otherwise marked thereon, alternate dark and light areas to represent the electron flow of the electrical circuit. The rope 12 is endless, representing a continuous electrical circuit. Rope 12 passes around pulley 13 which is driven by the motor 14 to simulate an electromotive force or battery E. The cord 12 is accordingly motivated by pulley 13. Guide pulleys 15 and 16 are attached to the board 10 at suitable points to guide the cord 12 in its continuous path. Members $R_1$ and $R_2$ are designed to impede the course of the cord 12 and represent resistive elements in the circuit.

The speed of movement of cord 12 simulates the current flow in the circuit. The greater the mechanical motive power imparted to pulley 13, the greater the speed of cord 12. This is similar to the electrical circuit where a larger electromotive force or voltage produces a proportionately greater current flow, other circuit parameters remaining the same.

Figure 2:
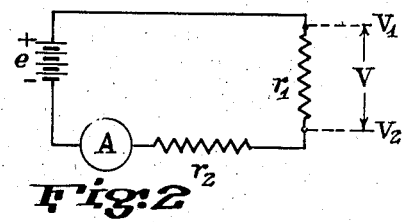

Figure 2 is the electrical circuit diagram represented by the arrangement of Figure 1. The battery $e$ is simulated by the motor 14 driving the pulley 13; the resistors $r_1$ and $r_2$ being represented by the corresponding units $R_1$ and $R_2$ to be hereinafter described in more detail.

Figure 3:
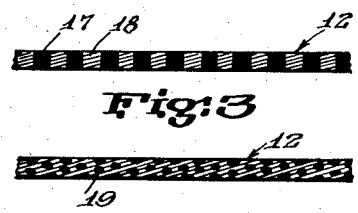
Figures 3 and 4 illustrate markings on the cord connecting the several pulleys of the apparatus to represent the flow of current or electrons through the circuit.
Figure 4:
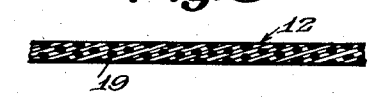

A section of the endless cord, rope or tape 12 is illustrated in Figure 3 showing the alternate dark and light sections 17 and 18 which may, for example, be black and yellow or black and white or any other combination of colors to clearly show the flowing nature of the circuit. In Figure 4 I have illustrated a modified form of the cord 12 showing numerous circular spots 19 on the cord 12 to represent the actual electrons in the circuit. The faster the cord 12, and hence electron counter-parts 19 move, the greater will be the current flow represented.

Figure 5:
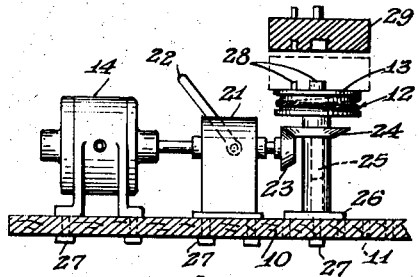
Figure 5 is an end view of the driving member representing the electromotive force of the circuit.

The motive force for imparting movement to the cord 12 is accomplished by the unit E of Figure 1, the end view of which is illustrated in Figure 5. The motor 14 is preferably an adjustable speed direct current motor, the speed of which is controlled by the field rheostat 20. It is to be understood that any suitable type of motor or speed control therefor may be employed. A mechanical motor may also be used and my invention is not limited to the specific motor or speed control employed. A clutch 21 is used to start or stop the cord motion by the clutch lever 22 without disconnecting the motor 14 from the power lines.

Referring to Figure 5 which is an end view of the motive unit E, the pulley 13 is driven by the suitable friction cone drive 23—24. The pulley 13 is preferably made of light weight material and is supported by rod 25 upon a base 26 which contains a suitable thrust bearing to permit ready rotation of the pulley 13 with a minimum of frictional or inertial resistance. The base portions and circuits of the various units contain bolts 27 which are inserted into the holes 11 of board 10 to rigidly support the units as will be understood. Although I illustrate bolts 27, it is to be understood that any simple suitable supporting means may be employed such as pegs and the like.

The cord 12 is wrapped around the pulley 13 preferably once, as illustrated. The top portion of pulley 13 has pegs 28 projecting therefrom. These pegs are used to support another driving pulley similar to 13 for a second circuit or to support a metallic unit 29 or more units which would add to the inertia of the circuit to represent inductance in the electrical analogy.

Figure 6:
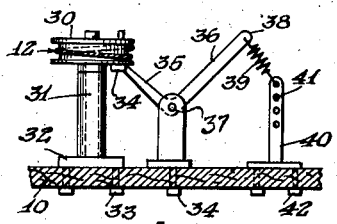
Figure 6 is an end view of the impedance or resistive element of the circuit.

Resistive elements $R_1$ and $R_2$ are essentially pulleys to which brake pressure is applied to impede its rotation. Figure 6 is an end view of a preferred form of the resistor unit. Pulley 30 is supported on a spindle 31 set in base 32 containing a thrust bearing which is in turn mounted upon base-board 10 by pegs or bolts 33. A brake plate 34 co-acts with the under surface of pulley 30 and is controlled by crank lever mechanism 35—36 pivoted at pivot 37. The pivot 37 is supported on board 10 by bolt 34. The end 38 of lever arm 36 is attached to a spring 39 which is, in turn, gripped by support member 40 containing a plurality of pegs 41. The spring 39 accordingly may be attached to any one of the pegs 41 in order to vary the pressure of the brake member 34 against the pulley 30 to in turn vary the resistive effect of the members $R_1$ and $R_2$. Post 40 is set into base-board 10 by bolt 42. It will now be evident that by attaching the corresponding end of spring 39 to a lower peg of the group 41, the pressure against pulley 30 will be increased, which serves to reduce the speed of the cord 12, simulating an increased resistance placed in the electrical circuit to reduce the current flow therein.

The E and R elements of the apparatus may be used to set up any combination of battery and resistance direct current circuit. By making motor 14 a reversible motor, the effect of current reversal is made evident to the students. By increasing the speed of the motor 14 through field rheostat 20, the effect of increasing the voltage of the circuit will become apparent by a proportionate increase in the speed of the cord 12 corresponding to the current flow in the circuit. The addition of resistor units corresponding to $R_1$ and $R_2$ reduces the current flow (speed of cord 12) for a given setting of the field rheostat 20 (constant voltage). The cord 12 is wrapped around the various pulleys once and the equipment is adjusted so that the cord 12 is reasonably taut to provide smooth motion thereof. Increasing the brake pressure at any of the resistor units R will reduce the speed of the cord 12 by causing it to slip upon the drive pulley 13 at motive unit E. Similarly, slippage may occur at any of the resistor pulleys 30. The speed of rotation of the guide pulleys 15 and 16 is directly proportional to the speed of the cord 12 representing the current flow in the circuit. A revolution counter I shown in Figure 1 applied to the axis of either of the guide pulleys 15 or 16 will indicate their relative speed and correspondingly indicate the "current flow" of the circuit. The scale of the revolution counter I may be marked in "inches of cord passed per second" or in "electrons flowing per second" or arbitrarily in "amperes."

The effect of inductance in an electrical circuit may be simulated by placing weighted pulleys or weights 29 as shown in Figure 5. Weight 29 may be added to any of the pulleys by means of peg arrangements. The effect of the "inductive load" upon the direct current circuit would be apparent in starting up the circuit from rest, for example by engaging the clutch 21. This effect will be a slower starting current which gradualy comes up to normal to simulate inductance in a direct current circuit. The effect of the inductive loads is slight upon the "steady state" or running condition, except for a slight resistance which the inductance imparts through bearing 25, simulating the small electrical resistance of all inductances.

Figure 7:
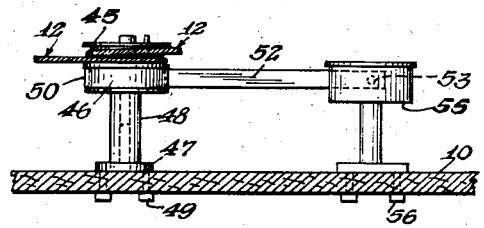
Figure 7 is an end view of the voltage measuring member of the circuit.

The "voltage" of the mechanical circuit of my invention is preferably measured by means of a Prony brake arrangement $V_1$ and $V_2$ as shown in Figures 1 and 7. The Prony brake measures the torque or pressure at any point in the circuit by means of the unit $V_1$ or $V_2$ corresponding to the absolute voltage of the electrical analogy. By using two units such as $V_1$ and $V_2$ on opposite sides of an impedance element such as $R_1$ illustrated in Figure 1, the voltage difference or the "voltage drop" existing across the impedance element R is determined.

The pressure or voltage measuring units comprise essentially of a pulley 45 mounted upon a brake wheel 46 supported upon a base 47 containing a thrust bearing for the support rod 48 which is supported on board 10 by bolts 49 (Figure 5). A brake band 50 together with the block 51 is attached to the brake arm 52 extending from the unit. The periphery of brake wheel 46 is preferably made slightly concave to better hold the brake band 50. A peg 53 projects near the end of brake arm 52 and co-acts with projection 54 of the spring balance meter 55 which records the force exerted against it by the V unit. Scale 55 is supported on base 10 by bolts 56. Rubber pegs 57 are preferably used to prevent the brake arm 52 from oscillating. The reading of scale 55 is proportional to the force or pressure of the cord 12 at that point and is preferably calibrated in arbitrary "volt" readings although other units may be employed.

By arranging units $V_1$ and $V_2$ as drawn in solid in Figure 1, the voltage drop or difference in potential between the two points may be calculated by subtracting the readings on the scales 55 and 55'. However, a single determination of the voltage difference may be determined by placing the V units as illustrated in dotted lines in Figure 1 to get the differential reading upon meter 55" which is preferably calibrated in volts. Rubber pegs 58 serve the same function as the rubber pegs 57.

Summarizing, the direct current circuit arrangements are set up by unit E serving as the voltage source, units $R_1$ or $R_2$ serving as resistance elements, guide pulleys 15 and 16 set in positions to keep the cord 12 taut and voltage measuring units V or $V_1$ and $V_2$ disposed at points where voltage is to be determined. The current of the "circuit" is determined by a revolution counter I applied to any of the guide pulleys such as 15 and 16. Increasing the speed of motive unit E by speed control 20 represents increasing the voltage of the circuit, giving corresponding increased V and I readings. Increasing the brake pressure against the pulleys 30 of the resistance units $R_1$ and $R_2$ slows down the speed of cord 12 and accordingly reduces the "current" of the circuit. "Inductance weights" corresponding to 29 (Figure 5) simulates the effective inductance in the transient or starting-up state of the circuit.

It is to be understood that the resistors may be assembled in different arrangements and more or less resistors than those illustrated may be used. By releasing the brake pressure of member 34 against the R pulleys 30, the effect of the removal of the particular resistor from the circuit is simulated.

Figure 8:
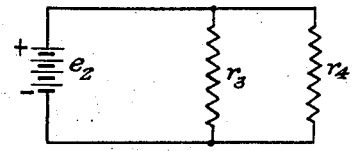
Figure 8 is a direct current parallel circuit simulated by the arrangement of the apparatus illustrated in Figure 9.
Figure 9:
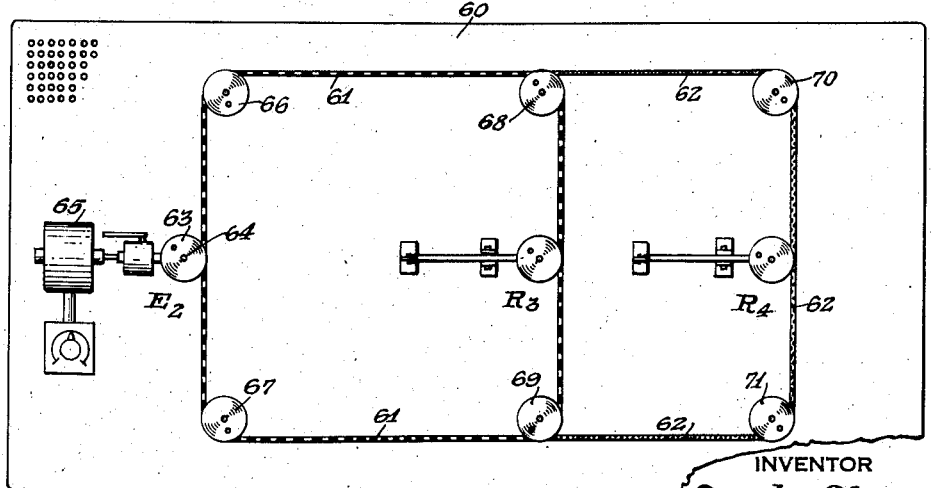
Figure 9 is a plan view of a form of my invention arranged to simulate a direct current circuit such as shown in Figure 8.

In Figure 9 is illustrated a parallel circuit arrangement analogous to the electrical circuit drawn in Figure 8 wherein resistors $r_3$ and $r_4$ are arranged in parallel across battery $e_2$. The apparatus of Figure 9 is mounted upon a board 60 having numerous holes similar to board 10 of Figure 1. The motive unit $E_2$ is similar to the motive unit E of Figure 1. The parallel circuit analogy is effected by two independent cord circuits 61 and 62 arranged one above the other with the motive source $E_2$ being common to both. Two pulleys, 63 and one beneath it (not shown) are arranged upon the rod 64 driven by motor 65 in a manner similar to the driving of rod 25 by motor 14 in Figure 5. The guide pulleys 66 and 67 are used to guide the circuit corresponding to cord 61. Beneath guide pulleys 66 and 67 are corresponding pulleys arranged to guide the cord circuit 62 disposed beneath that of 61. Guide pulleys 68 and 69 together with resistor unit $R_3$ complete the circuit corresponding to $r_3$ of the parallel arrangement. The other circuit corresponding to $r_4$ extends beyond the $r_3$ circuit and includes guide pulleys 70 and 71 together with the resistor unit $R_4$.

In the parallel circuit analogy in accordance with my invention, both independent current flows are visible by the speed of cords 61 and 62 at rates dependent upon the pressure applied to the individual brake units $R_3$ or $R_4$. By varying the speed of motive unit $E_2$ both "currents" are simultaneously and proportionately affected. Changing the brake pressures on units $R_3$ or $R_4$ corresponds to variation in the resistances $r_3$ and $r_4$ of the electrical circuit (Figure 8) and the individual currents will be correspondingly changed. The currents and voltage readings for the parallel circuit analogy may be taken in a manner hereinabove described in connection with the series circuit of Figure 1.

An important modification of my invention resides in the simulation of alternating current circuits. The mechanical elements are bolted or otherwise attached to the baseboard 10 having the plurality of holes 11. The spotted cord 100 corresponds to the cord 12 of the direct current modification. However, in the alternating current modification, mechanical elements are connected in series with the continuous closed or endless cord 100. A plurality of guide pulleys 101 define the path of the cord circuit 100 and keep the cord taut.

The alternating electromotive force $E_{a.c.}$ is obtained by motor drive 102 connected to a flywheel member 103 having spur gear teeth on its periphery, through a clutch 104. The fly-wheel 103 is connected to crosshead 105 by crossarm 106. This arrangement serves to translate the rotative power of motor 102 to rectilinear or linear oscillatory motion at the crosshead 105. The crosshead 105 is directly attached to the cord 100.

Figure 10:
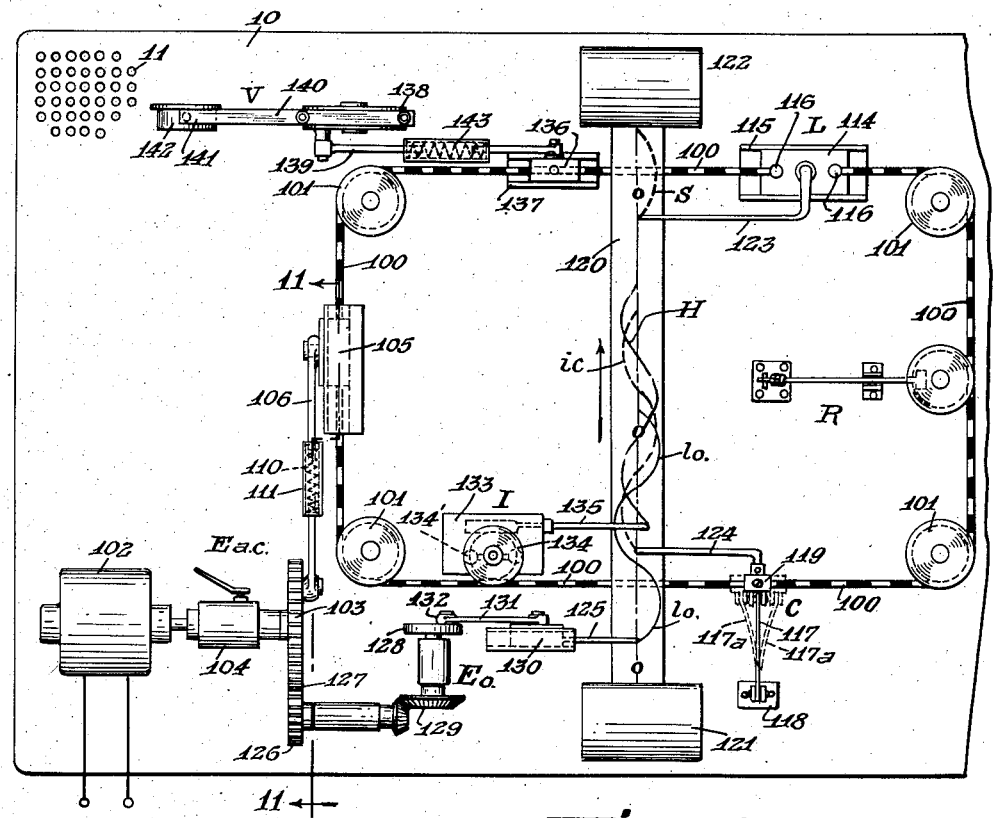
Figure 10 is a plan view of a preferred embodiment for mechanically simulating the series a. c. circuit of Figure 12.
Figure 11:
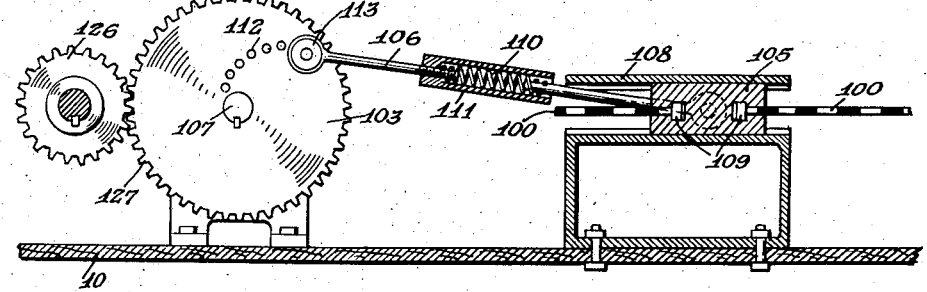
Figure 11 is the section taken along 11—11 of Figure 10 showing details of the drive representing the a. c. electromotive force.

Figure 11 is an end view taken along 11—11 of Figure 10 to further illustrate the connection between the fly-wheel 103 and the crosshead 105. Fly-wheel 103 is keyed to shaft 107 extending from clutch 104. Crosshead 105 slides horizontally in guide member 108 in a manner well known in the art. The ends of cord 100 connected to the crosshead 105 are shown having lugs 109 to facilitate mechanical fastening thereof. The crossarm 106 is made up of two sections connected by an elastic member or spring 110. A sleeve or housing 111 is provided for spring 110. The function of spring 110 is to transmit the oscillatory motion across the connecting rod 106 and also to permit fluctuations in the movement of the cord circuit 100 independent of the rotation of fly-wheel 103 or motor 102. The purpose of the compliant connection 110 is to render changes in the impedance elements of the cord circuit 100 apparent in the corresponding changes in the movement of the cord 100.

A series of holes 112 having different radial positions with respect to the shaft 107 are made in the fly-wheel 103. The end 113 of connecting rod 106 may be attached to any one of the holes 112. The extent of oscillation of crosshead 105 depends upon the radial position of end 113 of connecting rod 106 upon fly-wheel 103; the closer end 113 is to the center of rotation 107, the shorter will be the movements of crosshead 105. The variable position of end 113 upon fly-wheel 103 is used to simulate variable voltage conditions corresponding to the unit $E_{a.c.}$.

The speed of revolutions per second of motor 102 correspond exactly to the frequency or cycles per second of the cord circuit 100, since when no reduction gearing is used, one oscillation of the cord 100 occurs per revolution of motor 102. The amplitude of oscillation of cord 100 depends upon the value of the electromotive force imparted to the cord circuit by cross head 105, and is dependent upon the relative position of connecting-rod end 113 upon fly-wheel 103. The movement of cord 100 simulates the flow of electrons in an alternating current circuit. The frequency of motion of the cord corresponds exactly to the frequency of the whole circuit.

By introducing mechanical mass to the cord circuit 100, the effect of inductance in an electrical circuit is simulated. Accordingly, for the mechanical equivalent L of inductance, I provide a weight 114, slidable in guide posts 115, and rigidly connected to the cord 100 at terminals 116. The function of weight 114 is to increase the mass of the cord circuit 100 at the section it is introduced to simulate the corresponding lagging effect of inductance for current in an electrical circuit.

By introducing a compliant or spring component in the cord circuit 100, a mechanical equivalent C for an electrical condenser is had. Accordingly, I provide a leaf-spring 117, the fixed end of which is set into a post 118 bolted to the baseboard 10. The free end of leaf spring 117 is attached to cord 100 by a suitable member 119. The oscillatory excursions of cord 100 deflect leaf-spring 117 to the dotted positions 117a indicated. The elastic effect of leaf-spring 117 is to continuously tend to restore the cord 100 from its displaced position with respect to normal.

Figure 12:
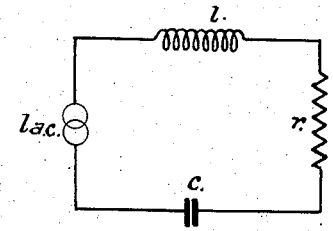
Figure 12 is the series a. c. circuit mechanically represented in Figure 10.

Figure 12 is a schematic electrical diagram corresponding to the electrical elements simulated in the mechanical arrangement of Figure 10. The alternating current voltage generator $e_{a.c.}$ corresponds to the reciprocating motive power $E_{a.c.}$; resistance $r$ corresponds to the resistive element R; the inductance $l$ corresponds to the mass element L; and the condenser $c$ corresponds to the spring element C. This circuit is a closed or series alternating current circuit, the electron or current flow of which is visually represented by the cord 100.

To further illustrate the electrical variations in the mechanical simulation, I provide means for recording these variations in various parts of the circuit and directly compare the results. A tape or band 120, preferably of paper, is passed at a constant rate transverse to the cord circuit 100 in the manner illustrated in Figure 10. A roll of paper band 120 is stored in compartment 121, and a clockwork feed or synchronous motor mechanism is enclosed in member 122 to move band 120 at a fixed speed. A recording arm 123 is attached to weight 114 and is adapted to mark a record of its motion upon band 120. Similarly, a recording arm 124 projects from connection 119 to leaf spring 117 to mark an independent record of motion of the portion of the circuit at C. The oscillatory excursions of cord 100 is reflected in a wave record of the arms 123 and 124 upon continuously moving band 120. Curve $i_c$ represents the voltage or force condition of the circuit as drawn by arm 124 at the part of the circuit adjacent thereto. Curve $i_l$ represents the voltage or force condition of the circuit at the part of the circuit adjacent thereto.

A reference time curve $I_0$ is provided by stylus 123 connected to mechanism $E_0$. Mechanism $E_0$ is directly driven by motor 102 through fly-wheel 103 and stylus 123 records a reference curve $I_0$ independent of any variations in the electrical circuit corresponding to cord 100. This device comprises a pinion 126 meshing with the spur teeth 127 cut into the periphery of fly-wheel 103. The rotation of pinion 126 is transmitted to a small fly-wheel 128 through bevelled gearing 129. Fly-wheel 128 is connected to a crosshead 130 by connecting rod 131. Stylus 125 is directly connected to a crosshead 130 by connecting rod 131. Stylus 125 is directly connected to crosshead 130. The extent of movement of stylus 125 depends upon the position of the end 132 of connecting rod 131 upon fly-wheel 128. The nearer rod end 132 is to the periphery of fly-wheel 128, the greater will be the amplitude of the reference curve $I_0$. The frequency of the curve $I_0$ is identical with that of the rest of the circuit since it is directly driven from the common motor 102. By maintaining the speed of motor 102 constant, the frequency of the records on band 120 will remain constant. Accordingly I prefer to use a synchronous motor for 102 although any other suitable motor may be employed. The amplitude of the reference time curve $I_0$ is optionally adjusted by suitably positioning of rod end 132 on fly-wheel 128 in a manner similar to the position of rod end 113 of rod 103 as shown in Figure 11.

By varying the magnitude of the impedance elements connected in the cord circuit 100 corresponding phase displacements will occur in curves $i_c$ and S with respect to the fixed reference curves $I_0$ as will be understood by those skilled in the art. The variation in L of the circuit may be effected by either changing the weight 114 or by adding to or subtracting from the weight 114 by pegged attachments to weight 114.

The instantaneous velocity of the cord 100 corresponding to the value of the effective current in the circuit may be accomplished by a ball governor device schematically indicated at 133. A pulley 134 is connected to the cord circuit 100 and oscillates a ball governor 134' with device 133. Variations in the velocity of cord circuit 100 are transmitted to stylus 135 projecting from device 133 which records a curve H on band 120. Curve H corresponds to instantaneous current at the portion of the cord circuit to which measuring device 133 is attached.

Although I have illustrated a mechanical ball governor device for obtaining the instantaneous velocity or current curve H in order to illustrate the phase displacement relations of the circuit, it is to be understood that other instantaneous cord velocity measuring devices may be substituted therefor. A bi-polar generator having a uniform flux field distribution may be connected to pulley 134 in place of ball governor device 134'. The output of the bi-polar generator may then be connected to a recording galvanometer by connection leads to the generator rotor with slip rings. The recording galvanometer will then have a stylus similar to 135 actuated thereby to trace the instantaneous current curve H.

The effective voltage or pressure at any portion of the cord circuit 100 may be measured by means of measuring device V attached to the cord at a small crosshead 136. The crosshead 136 assumes the vibrations of the cord 100 riding in a guide 137. The oscillations of crosshead 136 causes a brake wheel 138 to rotate through connecting rod 139. Brake wheel 138 is connected to brake arm 140 through a brake band (not shown but similar to the Prony brake device $V_1$ or $V_2$ of Figure 1). The end 141 of brake arm 140 is pressed against a scale 142 which measures the pressure at the end 141 of arm 140. The effective pressure reading of scale 142 corresponds to the effective voltage at the portion of the circuit at which the meter V is connected into the circuit spring 143 is preferably inserted in the arm 139 to effectively synchronize the meter V system with the cord circuit 100 in a manner similar to the application of spring 110 to the $E_{a.c.}$ device.

Although I have described preferred apparatus for carrying out my invention, it is to be understood that variations and modifications may be made by those skilled in the art, and accordingly I do not intend to be limited except as set forth in the following claims.

I claim:

1. A device for mechanically simulating a continuous electrical circuit including an endless substantially inextensible rope for representing the electrical circuit, and means for guiding said rope to define the closed path of said rope; and means for driving said rope comprising a series wound direct current motor, whereby the characteristic action of direct current circuits is closely simulated.

2. A device for mechanically simulating a continuous electrical circuit including an endless substantially inextensible rope for representing the electrical circuit, and means for guiding said rope to define the closed path of said rope and hold said rope taut; and means for driving said rope comprising and adjustable speed motor, whereby different voltage conditions in the circuit may be simulated.

3. A device for mechanically simulating a continuous electrical circuit including an endless substantially inextensible cord for representing the electrical circuit, and means for guiding said cord to define the path of said cord; means for driving said cord; and means for impeding the motion of said cord to simulate a resistance element in the circuit.

4. A device for mechanically simulating a continuous electrical circuit including an endless substantially inextensible cord for representing the electrical circuit, and means for guiding said cord to define the path of said cord; means for driving said cord comprising an adjustable speed motor, whereby different voltage conditions in the circuit may be simulated, and a first pulley driven by said motor, said cord being wound about said first pulley in a manner to enable slippage of the cord on the pulley; and means for impeding the motion of said cord to simulate a resistance element in the circuit comprising a second pulley coacting with said cord, and means for braking the rotation of said second pulley including a brake shoe operable against said second pulley.

5. A device for mechanically simulating a direct current electrical circuit including an endless substantially inextensible cord for representing the electrical circuit, and means for guiding said cord to define the closed path of said cord and hold said cord taut; means for driving said cord comprising a series wound direct current motor, whereby the characteristic action of direct current circuits is closely simulated; and means for impeding the motion of said cord to simulate a resistance element in the circuit comprising a pulley coacting with said cord, means for braking the rotation of said second pulley including a brake shoe operable against said second pulley, and means for adjusting the pressure of said brake shoe against said second pulley.

6. In a device of the type described, the combination of an endless substantially inextensible rope for representing an electrical circuit, and means for guiding said rope to define the path of said rope; means for driving said rope; and means for measuring the motive forces at a point in the rope circuit to simulate voltage thereat.

7. In combination, an endless substantially inextensible rope for representing an electrical circuit, and means for guiding said rope to define the path of said rope; means for driving said rope; means for impeding the motion of said rope to simulate a resistance element in the circuit; and means for measuring the motive force at a point in the rope circuit to simulate voltage thereat.

8. In combination, an endless substantially inextensible rope for representing an electrical circuit, and means for guiding said rope to define the path of said rope; means for driving said rope; means for impeding the motion of said rope to simulate a resistance element in the circuit; and means for measuring the motive force at a point in the rope circuit to simulate voltage thereat comprising a pulley rotatable by said rope, a prony brake system having a lever, mechanically connected to said pulley, and means for measuring the pressure at the projecting end of said lever.

9. A device for mechanically simulating a continuous electrical circuit including an endless substantially inextensible rope for representing the electrical circuit, said rope having spotted markings to represent electrons of the circuit, and means for guiding said rope to define the closed path of said rope and hold said rope taut; means for driving said rope comprising an adjustable speed motor, and a first pulley driven by said motor, said rope being wound loosely about said first pulley to permit slippage thereof; means for impeding the motion of said rope to simulate a resistance element in the circuit comprising a second pulley coacting with said rope, means for braking the rotation of said second pulley including a brake shoe operable against said second pulley, and means for adjusting the pressure of said brake shoe against said second pulley; means for measuring the motive force at a point in the rope circuit to simulate voltage thereat comprising a third pulley rotatable by said rope, a Prony brake system having a lever mechanically connected to said third pulley, and means for measuring the pressure at the projecting end of said lever; whereby the speed of movement of said rope is proportional to the magnitude of the electrical current flow represented, and is directly measurable by a determination of the speed of revolution of said rope guiding means.

10. A device for mechanically simulating a continuous electrical circuit including an endless substantially inextensible rope for representing the electrical circuit, said rope having spotted markings to represent electrons of the circuit, and means for guiding said rope to define the closed path of said rope and hold said rope taut; means for driving said rope comprising a series wound direct current motor, and a first pulley driven by said motor; means for impeding the motion of said rope to simulate a resistance element in the circuit comprising a second pulley coacting with said rope, means for braking the rotation of said second pulley including a brake shoe operable against said second pulley, and means for adjusting the pressure of said brake shoe against said second pulley; means for measuring the motive force at a point in the rope circuit to simulate voltage thereat comprising a third pulley rotatable by said rope, a Prony brake system having a lever mechanically connected to said third pulley, and means for measuring the pressure at the projecting end of said lever; means for increasing the inertia of the rope circuit to simulate inductance of the electrical counterpart comprising a cylindrical weight attachable to and rotatable by one of said pulleys whereby the speed of movement of said rope is proportional to the magnitude of the electrical current flow represented, and is directly measurable by a determination of the speed of revolution of said rope guiding means.

11. A device for mechanically simulating an alternating current electrical circuit including an endless substantially inextensible cord system, means for guiding said cord to define the path of said cord; and means for oscillating said cord comprising a motor and a device for translating the rotative power of said motor into linear oscillations at said cord.

12. A device for mechanically simulating an alternating current electrical circuit including an endless substantially inextensible cord system, means for guiding said cord to define the path of said cord, and hold said cord taut; and means for oscillating said cord comprising a motor and a device for translating the rotative power of said motor into linear oscillations at said cord including a flywheel, a crosshead connected to said cord, and a cross-arm connecting said crosshead to said flywheel, said cross-arm having an elastic section in series between said flywheel and crosshead to permit cord fluctuations independent of said motor.

13. A device for mechanically simulating an alternating current electrical circuit including an endless substantially inextensible cord system, means for guiding said cord to define the path of said cord, and hold said cord taut; and means for oscillating said cord comprising a motor and a device for translating the rotative power of said motor into linear oscillations at said cord.

14. A device for mechanically simulating an alternating current electrical circuit including an endless substantially inextensible cord system, means for guiding said cord to define the path of said cord, and hold said cord taut; means for oscillating said cord comprising a motor and a device for translating the rotative power of said motor into linear oscillations at said cord; and means for simulating an inductance comprising a weight connectible in series with said cord.

15. A device for mechanically simulating an alternating current electrical circuit including an endless substantially inextensible cord system, means for guiding said cord to define the path of said cord and hold said cord taut; means for oscillating said cord comprising a motor and a device for translating the rotative power of said motor into linear oscillations at said cord; means for increasing the inertia of the rope circuit to simulate inductance of the electrical counterpart comprising a weight connectible in series with said cord, said weight having a guide, and being slidable therein; compliant means connectible to said cord to simulate capacitance in the circuit comprising a leaf spring, one end of which is securable to said cord; and means for comparatively recording the excursions of said weight and yielding means connections comprising a band movable across said cord circuit and stylii individual to said connections for marking on said band.

16. A device for mechanically simulating an alternating current electrical circuit including an endless substantially inextensible cord system, means for guiding said cord to define the path of said cord, and hold said cord taut; means for oscillating said cord comprising a motor and a device for translating the rotative power of said motor into linear oscillations at said cord including a flywheel, a crosshead connected to said cord, and a cross-arm connecting said crosshead to said flywheel, said cross-head having an elastic section in series between said flywheel and crosshead to permit cord fluctuations independent of said motor; compliant means connectible to said cord to simulate capacitance in the circuit; means for simulating an inductance comprising a weight connectible in series with said cord; means for comparatively recording the excursions of said weight and yielding means connections comprising a band movable across said cord circuit and stylii individual to said connections for marking on said band; and mechanism for providing a reference marking on said band comprising a reciprocating stylus geared to said flywheel.

SANDER STERN.